UNITED STATES PATENT OFFICE.

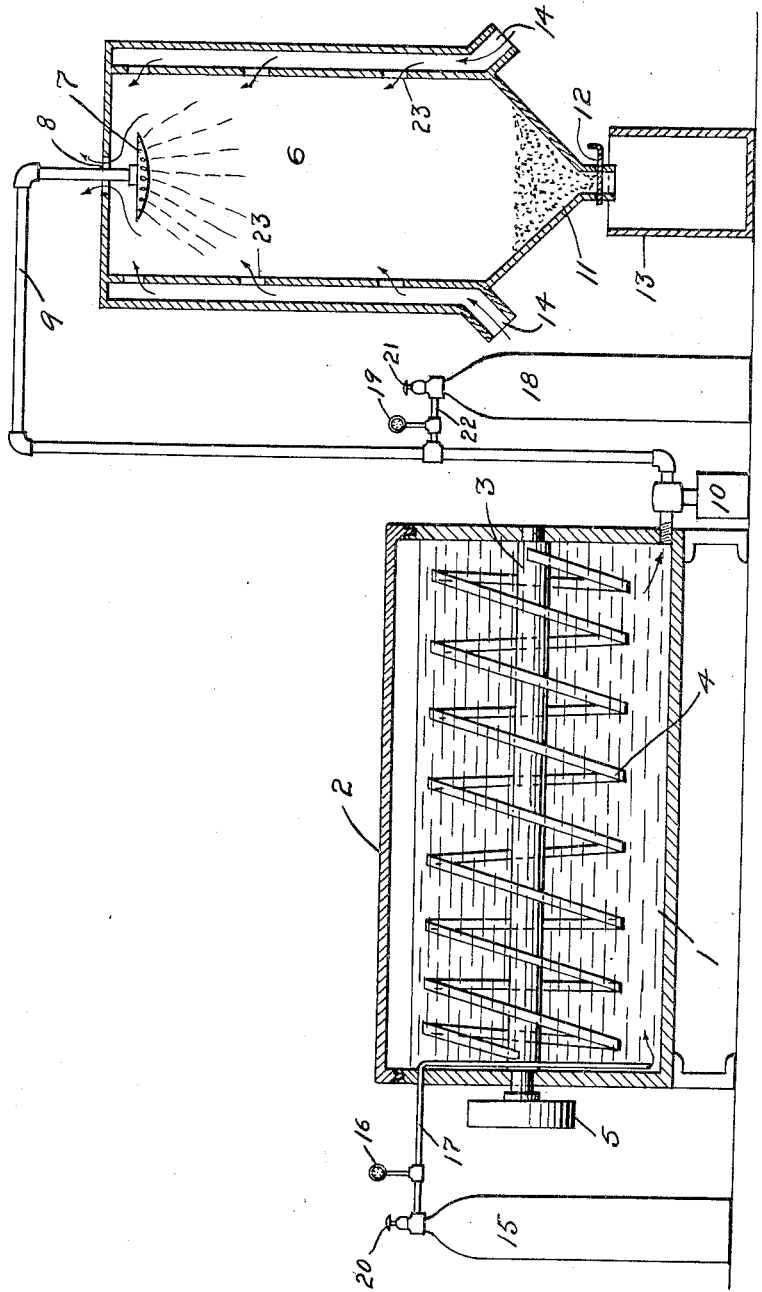

WILFRID PAUL HEATH, OF CHICAGO, ILLINOIS, AND ROBERT MANN WASHBURN, OF ST. PAUL, MINNESOTA.

PROCESS OF MANUFACTURING POWDERED MILK AND OTHER FOOD PRODUCTS.

1,406,381. Specification of Letters Patent. Patented Feb. 14, 1922.

Application filed April 12, 1920. Serial No. 373,311.

*To all whom it may concern:*

Be it known that we, WILFRID PAUL HEATH, a citizen of the United States, residing at Chicago, Cook County, Illinois, and ROBERT MANN WASHBURN, a citizen of the United States, residing at St. Paul, Ramsey County, Minnesota, have invented certain Improvements in Processes of Manufacturing Powdered Milk and other Food Products, of which the following is a specification.

This invention relates to an improved process designed particularly for the manufacture of powdered milk though capable of use in the manufacture of other food products.

Prior to our invention it has been the practice to produce powdered milk by atomizing the milk in a heated chamber in which the moisture is evaporated from the atomized milk by means of hot air, the air and vapor being carried off from the evaporating chamber and the solid constituents of the milk falling to the bottom of the chamber in powdered form.

We seek to reduce the bacteria content of the powdered milk product and to impart to said product a better and more agreeable flavor than can be obtained by the use of air alone, and this without subjecting the milk to the usual high temperatures which frequently impart a cooked taste to the product.

Our invention consists generally in dissolving in the milk prior to its atomization carbon dioxide or other sterile gas, whereby a portion of the gas will pass off with the heated air from the evaporating chamber, while a portion will remain impregnating the milk powder thereby reducing the bacteria content and imparting a better and more agreeable flavor to the product by virtue of the peculiar and invigorating properties of the gas.

The accompanying drawings represent an apparatus that is adapted for carrying out the improved process of manufacture.

In carrying out our invention we force into the liquid milk preferably in a suitable vat or chamber carbon dioxide ($CO_2$) or other suitable gas, and thoroughly mix the same therewith. Carbon dioxide has the property of being largely soluble in water and other liquids, and as it imparts an agreeable flavor to any product by which it is absorbed, we prefer to use this gas. Carbon dioxide gas is very soluble in water and a large volume under the pressure we employ will be dissolved in the milk. The milk containing the gas is fed to the atomizer in the evaporating chamber and aids in atomizing the milk, and as the water in the milk is evaporated a portion of the gas passes off with the vapor from the chamber, while a quantity thereof will be retained by the milk powder impregnating the same and providing an agreeable flavor thereto.

In the accompanying drawings, 1 represents a suitable vat or tank within which the liquid milk is placed. This vat is preferably provided with a cover 2 which may be secured in position preferably so as to furnish an air-tight closure for the tank, by any suitable means. The vat is preferably provided with the usual rotating shaft 3 and a spirally supported coil 4 through which water at the desired temperature may be passed so as to bring the milk in the vat to the temperature required. I have shown the shaft 3 provided with a pulley 5 located outside of the vat by means of which the stirrer in the vat may be rotated. 6 represents a suitable evaporating chamber, preferably provided with air inlet conduits 14 which communicate with the interior of the chamber through suitable openings 23. The evaporating chamber is preferably provided with a hopper bottom 11 and with a valve 12. A suitable receiving vessel or receptacle 13 may be placed below the chamber into which the powdered milk will pass when the valve 12 is open.

An atomizer 7 is arranged preferably in the upper part of the evaporating chamber and it is provided with a pipe 9 leading to the atomizer from the vat 1. A pump 10 may be arranged in connection with the pipe 9 to force the milk from the vat 1 to the atomizer 7, under any desired pressure. An opening 8 may be provided in the upper part of the evaporating chamber, through which the air and moisture removed from the milk may pass out of the evaporating chamber.

We provide in connection with the vat 1 means for forcing carbon dioxide, or other desired gas, into the milk contained in said vat, whereby said gas will be thoroughly intermingled with the liquid milk and a large portion thereof will be dissolved in the milk. We have shown for this purpose a usual carbon dioxide tank 15, with a pipe 17 leading from said tank to a point near the bottom of the vat 1. A valve 20 is provided for controlling the passage of the gas from the tank 15 to the vat and a pressure gage 16 is also preferably provided on the pipe 17.

We may also provide an additional gas tank 18 connected to the pipe 9 and having a connecting pipe 22, a regulating valve 21, and a pressure gage 19. By this means, as the milk is passing through the pipe 9 an additional amount of gas may be forced into it from the tank 18.

In carrying out our invention the liquid milk is placed in the vat 1, and the cover 2 of the vat is closed and secured in position so as to prevent the escape of any gas from the tank. The milk is brought to the desired temperature by means of the rotatable stirring and heating device. The carbon dioxide gas is forced into the bottom of a vat from the tank 15. By means of the stirring device it is thoroughly mixed with, and a large volume thereof is dissolved in, the milk. The milk is forced by means of a pump 10 under suitable pressure to the atomizer 7. The milk and gas dissolved therein are discharged into the upper part of the evaporating chamber in a fine spray. The heated air currents passing into and through the evaporating chamber vaporize the water, which forms a large portion of the volume of milk and the vapor thus produced passes out of the evaporating chamber with the air, through the opening 8 in the wall of the evaporating chamber. The solid constituents of the milk fall in the form of powder to the bottom of the evaporating chamber and may be removed therefrom by means of the valve 12. A considerable portion of the gas dissolved in the milk will pass off with the air and moisture evaporated from the milk, but a portion of the gas will remain impregnated or occluded in the milk powder. This gas will not only aid to increase the keeping qualities of the milk, but when carbon dioxide is used, it will impart an agreeable flavor to the milk powder by virtue of the peculiar and invigorating properties of this gas.

While we prefer to employ carbon dioxide as the gas by which the liquid milk is to be impregnated, owing to the fact that so large a volume of this gas can be dissolved in the liquid milk, and owing to the invigorating properties of such gas and the agreeable flavor that it imparts to any liquid by which is it absorbed, we do not wish to be limited to the use of this particular gas, as other sterile non-oxidizing gases such as nitrogen may be employed in carrying out this process.

While we have described this process as particularly applicable in the manufacture of powdered milk, it will be understood that it can be applied whenever it is desired to evaporate any liquid food product and to obtain in dry or powdered form from the solid constituents of said food to be stored or kept for a considerable period of time in said powdered or semi-solid form. We contemplate particularly the application of the process to various kinds of soup and to grape juice, as well as to other liquid food products.

We claim as our invention:

1. The process of producing powdered milk which consists in mixing with (natural) liquid milk a sterile non-oxidizing gas, forcing the milk, with the gas therein, to an atomizer arranged in an evaporating chamber, passing heated air through said chamber, and thereby vaporizing and carrying off the liquid constituents of the milk and a part of the gas, whereby a solid milk powder is produced impregnated with said gas.

2. The process of producing powdered milk which consists in mixing with the liquid milk a sterile non-oxidizing gas, atomizing the milk impregnated with said gas in a suitable evaporating chamber, vaporizing and carrying off the liquid constituents of the milk and a portion of the contained gas, and leaving in the chamber a solid milk powder impregnated with said gas.

3. The process of producing powdered milk which consists in dissolving in natural liquid milk, a sterile non-oxidizing gas, atomizing the milk containing said gas in a suitable evaporating chamber, vaporizing and carrying off the liquid constituents of the milk and a portion of the contained gas, and leaving as a resulting product a solid milk powder impregnated with said gas.

4. The process of producing powdered milk which consists in dissolving carbon dioxide in natural liquid milk, atomizing the milk containing said gas in a suitable evaporating chamber and vaporizing and carrying off the liquid constituents of the milk and a portion of the contained gas, and leaving, as a resulting product a solid milk powder impregnated with said gas.

5. The process of producing the solid constituents of liquid food products which consists in mixing with the liquid product a sterile non-oxidizing gas, forcing the liquid product with the gas therein to an atomizer arranged in an evaporating chamber, passing heated air through said chamber, and thereby vaporizing and carrying off the liquid constituents of the product and part of the gas, and leaving the solid or semi-solid constituents of the product impregnated with said gas.

6. The process of producing powdered milk which consists in mixing with natural liquid milk a sterile non-oxidizing gas under pressure, forcing the milk while still under pressure with the gas therein to an atomizer arranged in an evaporating chamber, passing heated air through said chamber and thereby vaporizing and carrying off the liquid constituents of the milk and a part of the gas whereby a solid milk powder is produced impregnated with said gas.

WILFRID PAUL HEATH.
ROBERT MANN WASHBURN.

Witnesses to signature of W. P. Heath:
GUY CARPENTER,
FRANK J. DOWD.

Witnesses to signature of R. M. Washburn:
C. H. REHFUSS,
GENEVIEVE E. SORENSEN.